United States Patent [19]

Potter et al.

[11] Patent Number: 5,389,718
[45] Date of Patent: Feb. 14, 1995

[54] TWO-COMPONENT AQUEOUS POLYURETHANE DISPERSIONS

[75] Inventors: Terry A. Potter, Beaver; Patricia B. Jacobs, Pittsburgh; Peter H. Markusch, McMurray, all of Pa.; James W. Rosthauser, Glen Dale, W. Va.

[73] Assignee: Miles Inc., Pittsburgh, Pa.

[21] Appl. No.: 249,486

[22] Filed: May 26, 1994

Related U.S. Application Data

[63] Continuation of Ser. No. 969,603, Oct. 30, 1992, which is a continuation of Ser. No. 730,754, Jul. 16, 1991, abandoned, which is a continuation-in-part of Ser. No. 644,180, Jan. 22, 1991, abandoned, which is a continuation-in-part of Ser. No. 559,805, Jul. 30, 1990, abandoned.

[51] Int. Cl.$^6$ ............................................. C08L 75/04
[52] U.S. Cl. .................................. 524/591; 524/839; 524/840; 524/906
[58] Field of Search ................. 524/591, 839, 840, 906

[56] References Cited

U.S. PATENT DOCUMENTS

| | | | |
|---|---|---|---|
| 3,728,140 | 4/1973 | Yoshida | 106/210 |
| 4,028,313 | 6/1977 | Muller et al. | 260/77.5 |
| 4,098,933 | 7/1978 | Burkhardt et al. | 427/379 |
| 4,608,413 | 8/1986 | Nachtkamp et al. | 524/591 |
| 4,663,377 | 5/1987 | Hombach et al. | 524/196 |
| 4,701,480 | 10/1987 | Markusch et al. | 524/591 |
| 4,745,151 | 5/1988 | Noll et al. | 524/591 |
| 4,871,798 | 10/1989 | Dormish et al. | 524/591 |
| 4,945,128 | 7/1990 | Hille et al. | 524/591 |
| 5,039,733 | 8/1991 | Dormish et al. | 524/591 |
| 5,075,370 | 12/1991 | Kubitza et al. | 524/591 |
| 5,194,487 | 3/1993 | Jacobs | 524/591 |

FOREIGN PATENT DOCUMENTS 0148970 7/1984 European Pat. Off. .
0427028 10/1990 European Pat. Off. .

*Primary Examiner*—Paul R. Michl
*Assistant Examiner*—Peter Szekely
*Attorney, Agent, or Firm*—Joseph C. Gil; Thomas W. Roy

[57] ABSTRACT

The present invention relates to a two-component, aqueous polyurethane coating composition which may be cured at ambient temperature and which contains I) a first component based on an aqueously dispersed polyurethane wherein the polyurethane has
  a) an average hydroxy functionality of at least 1.8
  b) a total content of urethane and urea groups, calculated as —NH—C—O—, of 9 to 20% by weight, based on the weight of the polyurethane, and
  c) sufficient chemically incorporated anionic groups and
  d) ethylene oxide units incorporated within terminal and/or lateral polyether chains to maintain the polyurethane stably dispersed in water, and II) a second component based on a water dispersible polyisocyanate wherein the polyisocyanate has
  a) an isocyanate content of 2 to 30% by weight, based on the weight of the polyisocyanate,
  b) an average functionality of at least 1.8 and
  c) sufficient chemically incorporated anionic groups and
  d) ethylene oxide units incorporated within terminal and/or lateral polyether chains to maintain the polyisocyanate stably dispersed in water, and components I and II are present in an amount sufficient to provide an equivalent ratio of isocyanate groups to hydroxyl groups of 0.8:1 to 6:1.

The present invention is also directed to the coatings prepared from these coating compositions.

18 Claims, No Drawings

TWO-COMPONENT AQUEOUS POLYURETHANE DISPERSIONS

This application is a continuation of application Ser. No. 07/969,603, filed Oct. 30, 1992, which is a continuation of Ser. No. 07/730,754, filed Jul. 10, 1991 (now abandoned), which is a continuation-in-part of Ser. No. 07/644,180, filed Jan. 22, 1991 (now abandoned), which is a continuation-in-part of Ser. No. 07,559,805, filed Jul. 30, 1990 (now abandoned).

BACKGROUND OF THE INVENTION

1. Field of the Invention

The present invention relates to two-component aqueous polyurethane dispersions which may be cured at ambient temperature and to the coatings prepared therefrom which have excellent hardness, flexibility, solvent resistance and surface appearance.

2. Description of the Prior Art

Aqueous polyurethane dispersions and their use for the production of coatings is known. The dispersions may be cured at ambient temperature by evaporation of water and coalescence of the individual polyurethane particles. These aqueous-based products have been developed in an effort to reduce the amount of organic solvents which are present in corresponding solvent-based coating compositions. Even though the prior art dispersions possess many valuable properties, it has not been possible to obtain coatings which possess all of the properties of coatings obtained from solvent-based coating compositions, especially hardness and solvent resistance.

The known aqueous polyurethane dispersions do not possess the amount of crosslinking which is required to obtain these properties. One method of increasing the amount of crosslinking is to blend the polyurethane dispersion with a water dispersible, blocked polyisocyanate as disclosed in U.S. Pat. No. 4,098,933. U.S. Pat. No. 4,608,413 discloses the use of water dispersible, blocked polyisocyanates in combination with polyurethanes which contain hydroxyl groups as crosslinking sites. While the systems disclosed in these patents make it possible to obtain improved hardness and crosslinking, they suffer from the disadvantage that the coating compositions must be heated to high temperatures in order to release the blocking agent and initiate crosslinking. Obviously, these coating compositions are not suitable for application to substrates which cannot withstand the unblocking temperature of the polyisocyanate.

Accordingly, it is an object of the present invention to provide aqueous polyurethane dispersions which may be cured at ambient temperature to provide coatings with excellent hardness, flexibility, solvent resistance and surface appearance.

This object may be achieved in accordance with the present invention as set forth hereinafter by the use of two-component coating compositions wherein one component is an aqueously dispersed, hydroxy functional polyurethane and the second component is a water dispersible, unblocked polyisocyanate.

Previously, it was known from U.S. Pat. No. 4,663,377 to modify aqueous polyurethane adhesive dispersions by the addition of water dispersible, unblocked polyisocyanates. German Offenlegungsschrift 3,728,140 teaches that an improvement in the heat activation temperature of the adhesive dispersions may be obtained by chain extending the polyurethane with a monoamine containing at least one hydroxyl group. Neither of these references suggest the use of the aqueous dispersions as coating compositions. In fact, it is surprising that the two-component dispersions according to the present invention can be used to prepare acceptable coatings. It would be expected that a portion of the isocyanate groups of the water dispersible polyisocyanate would react with the water present in the aqueous dispersions instead of the hydroxyl groups of the polyurethane because the reactivity of isocyanate groups with water and hydroxyl groups is similar. Because the isocyanate/water reaction produces carbon dioxide as a by-product, it would also be expected that some of the carbon dioxide would be trapped in the form of bubbles within the resulting coating rendering it unacceptable for further use. However, it has surprisingly been found that it is possible to obtain coatings in accordance with the present invention which are comparable in surface appearance to polyurethane coatings obtained from a two-component solvent based coating composition.

SUMMARY OF THE INVENTION

The present invention relates to a two-component, aqueous polyurethane coating composition which may be cured at ambient temperature and which contains I) a first component based on an aqueously dispersed polyurethane wherein the polyurethane has
  a) an average hydroxy functionality of at least 1.8,
  b) a total content of urethane and urea groups, calculated as —NH—C—O—, of g to 20% by weight, based on the weight of the polyurethane,
  c) 0 to 200 milliequivalents of chemically incorporated anionic groups per 100 g of polyurethane and
  d) 0 to 25% by weight, based on the weight of the polyurethane, of ethylene oxide units incorporated within terminal and/or lateral polyether chains, wherein components c) and d) are present in an amount which is sufficient to maintain the polyurethane stably dispersed in water, and II) a second component based on a water dispersible polyisocyanate wherein the polyisocyanate has
  a) an isocyanate content of 2 to 30% by weight, based on the weight of the polyisocyanate,
  b) an average functionality of at least 1.8,
  c) 0 to 200 milliequivalents of chemically incorporated anionic groups per 100 g of polyisocyanate and
  d) 0 to 25% by weight, based on the weight of the polyurethane, of ethylene oxide units incorporated within terminal and/or lateral polyether chains, wherein components c) and d) are present in an amount which is sufficient to maintain the polyisocyanate stably dispersed in water, and components I and II are present in an amount sufficient to provide an equivalent ratio of isocyanate groups to hydroxyl groups of 0.8:1 to 6:1.

The present invention is also directed to the coatings prepared from these coating compositions.

DETAILED DESCRIPTION OF THE INVENTION

The hydroxy functional polyurethanes used in conjunction with the water dispersible polyisocyanates in accordance with the present invention have an average hydroxy functionality of at least 1.8, preferably 1.8 to 8, more preferably 2 to 6 and most preferably 2.5 to 6; a total content of urethane and urea groups of 9 to 20% by weight, preferably about 10 to 17% by weight; and an average hydroxy equivalent weight (which may be calculated by an end group analysis) of about 100 to 5000, preferably 500 to 4000 and more preferably 1000 to 3000.

The hydroxy functional polyurethanes are based on the reaction product of organic polyisocyanates with a high molecular weight polyols, optionally low molecular weight, isocyanate-reactive compounds, and at least one of isocyanate-reactive compounds which contain anionic or potential anionic groups and isocyanate-reactive compounds containing nonionic hydrophilic groups. The reactants and their amounts are selected to ensure that the resulting polyurethane is hydroxy functional.

Suitable polyisocyanates for preparing the hydroxy functional polyurethane include any organic polyisocyanate, preferably monomeric diisocyanates. Especially preferred are polyisocyanates, especially diisocyanates, having aliphatically- and/or cycloaliphatically-bound isocyanate groups, although polyisocyanates having aromatically-bound isocyanate groups are not excluded and may be used.

Examples of suitable polyisocyanates which may be used include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and/or -1,4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4- and/or 2,6-hexahydrotoluylene diisocyanate, 2,4'- and/or 4,4'-dicyclohexylmethane diisocyanate, $\alpha,\alpha,\alpha',\alpha'$-tetramethyl-1,3- and/or -1,4-xylylene diisocyanate, 1,3- and 1,4-xylylene diisocyanate, 1-isocyanato-1-methyl-4(3)-isocyanatomethyl-cyclohexane, 1,3- and 1,4-phenylene diisocyanate, 2,4- and/or 2,6-toluylene diisocyanate, diphenyl methane-2,4'- and/or -4,4'-diisocyanate, naphthalene-1,5-diisocyanate, triphenyl methane-4,4',4"-triisocyanate, polyphenyl polymethylene polyisocyanates of the type obtained by condensing aniline with formaldehyde followed by phosgenation, and mixtures of the above-mentioned polyisocyanates.

Suitable high molecular weight polyols for preparing the hydroxy functional polyurethane include those which are known from polyurethane chemistry and have molecular weights ($M_n$) of 400 to 6,000, preferably 400 to 3,000. Examples of the high molecular weight compounds include:

1) polyhydroxy polyesters which are obtained from polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydropthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl - 1,3-pentanediol, glycerine and trimethylol propane.

2) Polylactones generally known from polyurethane chemistry, e.g., polymers of $\epsilon$-caprolactone initiated with the above-mentioned polyhydric alcohols.

3) Polycarbonates containing hydroxyl groups such as the products obtained from reaction of the polyhydric alcohols previously set forth for preparing the polyhydroxy polyesters (preferably dihydric alcohols such as 1,3-propanediol, 1,4-butanediol, 1,4-dimethylol cyclohexane, 1,6-hexanediol, diethylene glycol, triethylene glycol or tetraethylene glycol) with phosgene, diaryl carbonates such as diphenyl carbonate or cyclic carbonates such as ethylene or propylene carbonate. Also suitable are polyester carbonates obtained by the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than 10% by weight of ethylene oxide; however, polyethers which do not contain ethylene oxide are preferably used. Suitable starting compounds containing at least one reactive hydrogen atom include the polyols set forth as suitable for preparing the polyhydroxy polyesters and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides, ammonia, methylamine, tetramethylenediamine, ethanolamine, diethanolamine, triethanolamine, aniline, phenylenediamine, 2,4- and 2,6-toluylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred.

Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695; and German Patent No. 1,152,536). Also suitable as polyethers are amino polyethers wherein at least a portion of the hydroxyl groups of the previously described polyethers are converted to amino groups.

5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

6) Polyacetals including those obtained from the above mentioned polyhydric alcohols, especially diethylene glycol, triethylene glycol, 4,4'-dioxethoxy-diphenyldimethylene, 1,6-hexanediol and formaldehyde. Polyacetals suitable for use in the invention may also be prepared by the polymerization of cyclic acetals.

7) Polyether esters containing isocyanate-reactive groups and known in the art.

8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

The preferred high molecular weight isocyanate-reactive compounds for use in the process according to the invention are the dihydroxy polyesters, dihydroxy polylactones, dihydroxy polycarbonates and dihydroxy polyester carbonates.

Suitable low molecular weight isocyanate-reactive compounds which may optionally be used in accordance with the present invention have molecular weights of up to about 400 and functionalities which correspond to those of the hydroxy functional polyurethanes. Examples include the polyols and diamines previously set forth for use in the preparation of the polyhydroxy polyesters and the polyethers and the aminoalcohols set forth hereinafter.

In order to make the hydroxy functional polyurethanes water dispersible, it is necessary to chemically incorporate hydrophilic groups, i.e., anionic groups, potential anionic groups or nonionic hydrophilic groups, into the polyisocyanate component. Suitable hydrophilic components contain at least one isocyanate-reactive group and at least one hydrophilic group or potential hydrophilic group. Examples of compounds which may be used to incorporate potential ionic groups include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below 400. It should be emphasized that the carboxylic acid groups are not considered to be isocyanate-reactive groups due to their sluggish reactivity with isocyanates.

The preferred anionic groups for incorporation into the hydroxy functional polyurethanes in the present invention are carboxylate groups and these groups may be introduced by using hydroxy-carboxylic acids of the general formula:

wherein
Q represents a straight or branched, hydrocarbon radical containing 1 to 12 carbon atoms, and
x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula:

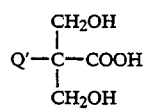

wherein Q' is hydrogen or an alkyl group containing 1 to 8 carbon atoms. The most preferred compound is α,α-dimethylol propionic acid, i.e, wherein Q' is methyl in the above formula.

The acid groups may be converted into hydrophilic anionic groups by treatment with a neutralizing agent such as an alkali metal salt, ammonia or a primary, secondary or preferably tertiary amine in an amount sufficient to render the hydroxy functional polyurethanes water dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile organic compounds such as volatile amines since they lead to reduced resistance to water swell in the coatings produced from the water dispersible compositions of the present invention. Therefore, less than 50%, preferably less than 20% and most preferably none of the acid groups should be neutralized with alkali metals.

The preferred volatile amines for neutralizing the acid groups are the tertiary amines, while ammonia and the primary and secondary amines are less preferred. Examples of suitable amines include trimethylamine, triethylamine, triisopropylamine, tributylamine, N,N-dimethyl-cyclohexylamine, N,N-dimethylstearylamine, N,N-dimethylaniline, N-methylmorpholine, N-ethylmorpholine, N-methylpiperazine, N-methylpyrrolidine, N-methylpiperidine, N,N-dimethylethanolamine, N,N-diethylethanolamine, triethanolamine, N-methyldiethanolamine, dimethyl aminopropanol, 2-methoxyethyldimethylamine, N-hydroxyethylpiperazine, 2-(2-dimethylaminoethoxy)ethanol and 5-diethylamino-2-pentanone. The most preferred tertiary amines are those which do not contain isocyanate-reactive groups as determined by the Zerewitinoff test since they are capable of reacting with isocyanate groups during the curing of the compositions of the present invention.

In a preferred embodiment of the present invention volatile tertiary amines are used so that when the water dispersible coating composition of the subject application are cured, the tertiary amine is removed from the coated substrate.

The acid groups may be converted into hydrophilic anionic groups by treatment with the alkali metal or preferably the volatile amine either before, during or after their incorporation into the hydroxy functional polyurethane. However, it is preferred to neutralize the acid groups after their incorporation.

The compounds containing lateral or terminal, hydrophilic ethylene oxide units have at least one, preferably one, isocyanate-reactive group and are an optional component, which may be present in an amount sufficient to provide a content of hydrophilic ethylene oxide units (calculated as —CH$_2$—CH$_2$—O—) present in lateral or terminal chains of up to 25% by weight. When compounds containing hydrophilic ethylene oxide units are used, they are preferably incorporated into the hydroxy functional polyurethanes in an amount sufficient to provide a content of hydrophilic ethylene oxide units of greater than 1% by weight, more preferably greater than 3% by weight, based on the weight of the hydroxy functional polyurethane. The preferred upper limit for the hydrophilic ethylene oxide units is 10% by weight, more preferably 7% by weight, based on the weight of the hydroxy functional polyurethane.

Hydrophilic components having terminal or lateral hydrophilic chains containing ethylene oxide units include compounds corresponding to the formulas

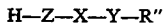

or

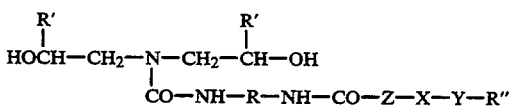

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R'' represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least 40%, preferably at least 65%, of the chain members comprise ethylene oxide units and the remainder comprises other alkylene oxide units such as propylene oxide, butylene oxide or styrene oxide units, preferably propylene oxide units,
Y represents oxygen or —NR'''— wherein R''' has the same definition as R'' and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The hydroxy functional polyurethanes have a content of chemically incorporated anionic groups of 0 to 200, preferably 10 to 200, more preferably 10 to 180 and most preferably 20 to 100 milliequivalents per 100 g of solids, and a content of chemically incorporated nonionic groups of 0 to 25% by weight. When compounds containing hydrophilic ethylene oxide units are used, they are preferably incorporated into the hydroxy functional polyurethanes in an amount sufficient to provide a content of hydrophilic ethylene oxide units of greater than 1% by weight, more preferably greater than 3% by weight, based on the weight of the hydroxy functional polyurethane. The upper limit for the content of the hydrophilic ethylene oxide units is preferably 10% by weight, more preferably 7% by weight, based on the weight of the hydroxy functional polyurethane. The amounts of the anionic groups and hydrophilic ethylene oxide units must be sufficient for the hydroxy functional polyurethane to remain stably dispersed in water.

The hydroxy functional polyurethanes may be produced according to methods known in the art. For example, the above-mentioned reaction components may be added in any sequence. One preferred method comprises mixing all of the isocyanate-reactive components and subsequently reacting the mixture with the polyisocyanate. The number of isocyanate-reactive groups per isocyanate group is maintained at 1.1:1 to 4:1, preferably 1.2:1 to 1.8:1. The mixture is then reacted until no further NCO groups can be detected. The reaction may take place in the melt or in the presence of organic solvents. Suitable solvents include the water-miscible solvents normally used in polyurethane chemistry such as esters, ketones, halogenated hydrocarbons, alkanes and arenes. Low boiling solvents include those boiling at temperatures in the range of 40° to 90° C. such as acetone and methyl ethyl ketone. In addition, higher boiling solvents such as N-methyl pyrrol idinone, dimethyl formamide, dimethyl sulfoxide, propylene glycol monomethyl ether acetate and ethylene glycol mono(-methyl, -ethyl or -butyl) ether acetate may be utilized.

In another preferred method an NCO terminated prepolymer is prepared by reacting the polyisocyanate with the high molecular weight polyol, the isocyanate-reactive compound containing the hydrophilic or potential hydrophilic group and optionally a low molecular weight compound containing at least two isocyanate reactive groups. The NCO prepolymer is then converted to a hydroxy functional polyurethane by a further reaction with a primary or secondary monoamine containing at least one hydroxy group. Suitable examples of these monoamines include ethanolamine, N-methylethanolamine, diethanolamine, 3-amino- 1- propanol and 2-amino-2-hydroxymethyl propane- 1,3-diol.

In a further preferred method an NCO terminated prepolymer is prepared as described above. However, instead of capping the isocyanate groups with a monoamine, the NCO terminated prepolymer is chain extended with a hydroxy group-containing polyamine, e.g, N-hydroxyethyl-ethylene diamine. When this chain extender is used in an amount which is sufficient to provide an NCO:NH ratio of approximately 1.0, a chain extended, hydroxy functional polyurethane is obtained which contains lateral hydroxy groups.

The water dispersible polyisocyanates to be used according to the invention have an (average) NCO functionality of at least 1.8, preferably 2 to 8 and more preferably 2.5 to 6, and an NCO content of 2 to 30%, preferably 10 to 25%. Their dispersibility in water is ensured by a sufficient content of suitable emulsifiers.

Suitable polyisocyanates for preparing the water dispersible polyisocyanates include any of the monomeric diisocyanates or polyisocyanates which have previously been described as suitable for the preparation of the hydroxy functional polyurethanes, preferably the monomeric aliphatic and/or cycloaliphatic diisocyanates. However, it is preferred to prepare the water dispersible polyisocyanates from polyisocyanate adducts containing carbodiimide, uretdione, biuret, allophanate, urethane or isocyanurate groups, or from NCO prepolymers which have been prepared from the previously described aliphatic and/or cycloaliphatic diisocyanates.

Suitable polyisocyanate adducts include:
1) Isocyanurate group-containing polyisocyanates prepared from the previously described aliphatic and/or cycloaliphatic diisocyanates. Particularly preferred are isocyanato-isocyanurates based on 1,6-diisocyanatohexane and/or 1-isocyanato-3,3,5-trimethyl-5-isocyanatomethyl-cyclohexane (isophorone diisocyanate or IPDI). The production of these isocyanurate group-containing polyisocyanates is described, for example, in DE-PS 2,616,416, EP-OS 3,765, EP-OS 10,589, EP-OS 47,452, U.S. Pat. Nos. 4,288,586 and 4,324,879. The isocyanato-isocyanurates generally have an average NCO functionality of 3 to 3.5 and an NCO content of 5 to 30%, preferably 10 to 25% and most preferably 15 to 25% by weight.
2) Uretdione diisocyanates prepared from the previously described aliphatic and/or cycloaliphatic diisocyanates. The uretdione diisocyanates are preferably prepared from hexamethylene diisocyanate and/or of IPDI. The uretdione diisocyanates can be used as the sole component for preparing the water dispersible polyisocyanates or in admixture with other aliphatic and/or cycloaliphatic polyisocyanates, particularly the isocyanurate group-containing polyisocyanates set forth under (1) above.
3) Biuret group-containing polyisocyanates prepared from the previously described aliphatic and/or cycloaliphatic diisocyanates, particularly tris-(6-isocyanatohexyl)-biuret or mixtures thereof with its higher homologues. The biuret group-containing polyisocyanates generally have a most preferred NCO content of 18 to 22% by weight and an average NCO functionality of 3 to 3.5.
4) Urethane and/or allophanate group-containing polyisocyanates prepared from the previously described aliphatic and/or cycloaliphatic diisocyanates, preferably hexamethylene diisocyanate or IPDI, by reacting excess quantities of the lo diisocyanates with the previously described low molecular weight polyols, preferably trimethylol propane, glycerine, 1,2-dihydroxy propane or mixtures thereof. The urethane and/or allophanate group-containing polyisocyanates have a most preferred NCO content of 12 to 20% by weight and an (average) NCO functionality of 2.5 to 3.
5) Oxadiazinetrione group-containing polyisocyanates prepared from the previously described aliphatic and/or cycloaliphatic diisocyanates, preferably hexamethylene diisocyanate.

The materials to be used for the preparation of the water dispersible NCO prepolymer are the same as those used for the preparation of the hydroxy functional polyurethane. In contrast to the hydroxy functional polyurethanes the NCO prepolymers have terminal isocyanate groups. The type and proportions of the above-mentioned starting materials are therefore selected such that the resulting prepolymers have terminal isocyanate groups.

The NCO prepolymers are less preferred than the polyisocyanate adducts for use in the preparation of the water dispersible polyisocyanates because due to their higher molecular weight they also have a higher viscosity. The higher viscosity may necessitate the additional use of a solvent in order to maintain the polyisocyanate stably dispersed in water after it is blended with the aqueous dispersion of the hydroxy functional polyurethane.

Mixtures of the monomeric polyisocyanates, the polyisocyanate adducts and/or the NCO prepolymers may also be used for preparing the water dispersible polyisocyanates.

The compounds for providing hydrophilicity to the water dispersible polyisocyanates are also the same as those previously described for providing hydrophilicity to the hydroxy functional polyurethanes. The water dispersible polyisocyanates are prepared by reacting the polyisocyanates with the hydrophilic compounds containing isocyanate-reactive groups, preferably with the monofunctional, nonionic hydrophilic polyether alcohols, in an amount sufficient to provide the desired amount of hydrophilic groups at a temperature of 50° to 130° C.

The water dispersible polyisocyanates have a content of chemically incorporated nonionic groups of 0 to 25% by weight, preferably 2 to 25% by weight, more preferably 5 to 20% by weight and most preferably 7 to 15% by weight of hydrophilic ethylene oxide units (calculated as $-CH_2-CH_2-O-$) incorporated in lateral or terminal polyether chains, and a content of chemically incorporated anionic groups of 0 to 200 milliequivalents per 100 g of solids, based on the weight of the water dispersible polyisocyanate. When anionic groups are used, they are preferably incorporated into the water dispersible polyisocyanate in an amount sufficient to provide an anionic group content of least 10, more preferably at least 20 milliequivalents per 100 g of solids, based on the weight of the water dispersible polyisocyanate. The upper limit for the content of the anionic groups is preferably 180, more preferably 100 milliequivalents per 100 g of solids, based on the weight of the water dispersible polyisocyanate.

In accordance with a preferred embodiment of the present invention when the water dispersible polyisocyanate contains uretdione groups, it does not also contain chemically incorporated carboxylate groups to provide hydrophilicity.

In order to reduce the viscosity of the water dispersible polyisocyanates an organic solvent such as those previously described for use with the hydroxy functional polyurethanes may be added to the water dispersible polyisocyanate before they are blended with the hydroxy functional polyurethane. It is also possible to convert the water dispersible polyisocyanates into aqueous dispersions with a solids content of 10 to 65% by weight. The production of these dispersions should take place shortly before the dispersed polyisocyanates are blended with the hydroxy functional polyurethanes.

The water dispersible polyisocyanate should not be blended with the hydroxy functional polyurethane until it is time to apply the coating composition to a suitable substrate. As with two component, solvent based coating compositions, the mixture of the coreactants has a limited useful potlife, which is dependent upon the reactivity of the coreactants, ratios of coreactants and catalysts present in the system. When it is desired to blend the two components, the water dispersible polyisocyanate may simply be added to the water dispersible, hydroxy functional polyurethane or vice versa with mild stirring. Methods for blending the two components are known in the art.

Coatings prepared from the aqueous coating compositions according to the present invention are distinguished by excellent hardness, flexibility and solvent resistance, and especially an excellent surface appearance. All coatings, even those prepared from two-component solvent based coating compositions, exhibit certain defects when examined with the naked eye or under a low power microscope. The defects are caused by insoluble materials or by voids which are formed during formation of the coatings. Even though the coatings obtained in accordance with the present invention contain these expected defects, surprisingly they do not contain bubbles (from carbon dioxide generated by the reaction between isocyanate groups and water) which detract from the surface appearance.

Conventional dispersions contain fully reacted polyurethanes in the form of discrete particles. When these dispersions are applied to a suitable substrate, coatings are formed by the coalescence of these particles. To the contrary the two-component aqueous compositions according to the present invention are not fully reacted when they are applied to a substrate. Isocyanate groups remain after the compositions are applied to a substrate and it would be expected that these isocyanate groups would react with water to form carbon dioxide which would become trapped in the coating resulting in an unacceptable appearance. Surprisingly, this does not happen. Even though water is present in a large excess when compared to the hydroxyl groups of the aqueously dispersed polyurethane, the isocyanate groups react with the hydroxyl groups of the polyurethane instead of water as evidenced by the lack of bubbles from carbon dioxide formation and the excellent coatings properties which can only be obtained from the molecular weight build-up which is associated with the reaction between isocyanate groups of the polyisocyanate component and the hydroxyl groups of the dispersed polyurethane.

The two components should be blended in amounts sufficient to provide a ratio of isocyanate groups from the water dispersible polyisocyanate to hydroxy groups of the hydroxy functional polyurethane of 0.8:1 to 6:1, preferably about 1.2:1 to 4:1. After the two components have been blended the coating composition should have a solids content of about 2 to 60%, preferably about 10 to 50% by weight.

The aqueous coating compositions according to the present invention may be applied to substrates using any of the various techniques known in the art. In addition, the aqueous compositions may be blended with other types of resins optionally containing isocyanate-reactive groups or with amine- or phenol-formaldehyde condensates known in the art. They can also contain pigments, levelling agents, catalysts, and other auxiliaries known in the art. Examples of the application techniques, resins and auxiliaries are set forth in U.S. Pat. No. 4,408,008, which is herein incorporated by reference.

The invention is further illustrated but is not intended to be limited by the following examples in which all parts and percentages are by weight unless otherwise specified.

Isocyanate Crosslinker A

To 900 parts of a polyisocyanate containing isocyanurate groups and prepared from hexamethylene diisocyanate (Desmodur N-3300, available from Mobay Corp.) were added 100.0 parts of a polyether monohydric alcohol having an OH number of 26.2 and prepared from n-butanol, ethylene oxide, and propylene oxide (molar ratio of ethylene oxide to propylene oxide—83:17). The reaction mixture was stirred and heated at 110° C. for 1.5 hours.

Solids content—100%
Viscosity—3900 (25° C., #4 spindle, 60 rpm)
Isocyanate content—18.8%

Isocyanate Crosslinker B

The reaction product of 500 parts of the polyisocyanate used to prepare Isocyanate Crosslinker A and 26.3 parts of a polyethylene oxide polyether monohydric alcohol having a molecular weight of 1210 and initiated with 3-ethyl-3-hydroxymethyl-oxetane.

Isocyanate content—19.5%

EXAMPLE 1

Preparation of Dispersion A

A mixture of 132.8 parts of a polyester diol prepared from phthalic anhydride and hexanediol (OH number 56), 5.0 parts of the polyether monohydric alcohol used to prepare Isocyanate Crosslinker A, 13.4 parts of neopentylglycol, 20.6 parts of α,α dimethylolpropionic acid, and 90 parts of N-methylpyrrolidinone was heated to 70° C. with stirring. To this mixture, 127.6 parts of 4,4'-dicyclohexylmethane diisocyanate were added, and the resulting mixture was stirred and heated at 110° C. for 1 hour until the theoretical isocyanate content of 3.0 was reached. The reaction was cooled to 70° C., and 15.6 parts of triethylamine were added. After stirring for 15 minutes at 70° C., 17.0 parts of ethanolamine and 50 parts of N-methylpyrrolidinone were added. After the reaction exothermed to 92° C., the mixture was cooled to 70° C. and stirred until it was found to be NCO-free by IR. 5.0 parts of the above polyether monohydric alcohol in 50 parts of N-methylpyrrolidone were added, and the reaction mixture stirred for 30 minutes. 391.3 parts of distilled water at 50° C. were added to the mixture and the resulting dispersion was stirred for one hour.

pH—9.3
Solids—35% functionality—2
Urethane/urea content—13.0% (calculated as NH—C—O, MW 43)

Two Component Formulation

To 200 parts of Dispersion A were added 40.0 parts of Isocyanate Crosslinker A (NCO/OH equivalent ratio—3.0), and 0.12 parts of a 10% aqueous solution of Surfactant A (Silwet L-77, available from Union Carbide) and the mixture was stirred vigorously. Drawdown bars were used to make 6 mil (wet film thickness, WFT) films on glass plates and 5 mil WFT films on Bonderite treated steel panels.

EXAMPLES 2-6

Dispersions B-F, Compositions

Dispersions B-F were prepared in the same manner as Dispersion A using the materials and amounts set forth in Table 1.

TABLE 1

| Dispersion | B | C | D | E | F |
| --- | --- | --- | --- | --- | --- |
| Polyester A | 125.2 | 56.4 | | | 323.8 |
| Polyester B | | | 95.0 | 56.5 | |
| NPG | 0.2 | 28.3 | 17.1 | 22.3 | 31.8 |
| TMP | 4.7 | | | 4.7 | 58.6 |
| DMPA | 8.3 | 8.3 | 8.3 | 8.3 | 24.1 |
| NMP | 60.0 | 60.0 | 60.0 | 120.0 | 300.0 |
| HMDI | 60.6 | 107.2 | 83.9 | 107.7 | 261.8 |
| TEA | 6.0 | 6.0 | 6.0 | 6.0 | 17.2 |
| EOA | | | 5.7 | | |
| DEOA | 11.0 | 9.8 | | 11.0 | |
| Distilled Water | 424.0 | 424.0 | 424.0 | 364.0 | 982.7 |
| % Solids | 30 | 30 | 30 | 30 | 35 |
| pH | 9.2 | 9.0 | 9.8 | 9.4 | 8.1 |
| Functionality | 6 | 4 | 2 | 6 | 6 |
| Urethane/Urea (%) | 9.5 | 16.8 | 13.1 | 16.8 | 12.2 |

Polyester A - a hexanediol phthalate, OH number 56.1
Polyester B - a neopentyl glycol adipate, OH number 56.1
NPG - neopentyl glycol
TMP - trimethylol propane
DMPA - α,α-dimethylolpropionic acid
NMP - N-methylpyrrolidinone
HMDI - 4,4'-dicyclohexylmethane diisocyanate
TEA - triethylamine
EOA - ethanolamine
DEOA - diethanolamine
Two Component Formulations 2-6

Two component formulations 2-6 were prepared as in Example 1 using the materials and amounts set forth in Table 2.

TABLE 2

| Example | 2 | 3 | 4 | 5 | 6 |
| --- | --- | --- | --- | --- | --- |
| Dispersion | B | C | D | E | F |
| Amount | 75.0 | 75.0 | 75.0 | 75.0 | 180.0 |
| Isocyanate Crosslinker A | 19.9 | 17.7 | 13.3 | 19.0 | 49.6 |
| Surfactant A | 0.05 | 0.08 | 0.08 | 0.05 | 0.12 |
| NCO/OH equiv ratio | 4 | 4 | 3 | 4 | 3.6 |

EXAMPLE 7

Preparation of Dispersion G

A mixture of 122.5 parts of a polyester of phthalic anhydride and hexanediol (OH number 56), 4.0 parts of neopentylglycol and 8.3 parts of α,α dimethylolpropionic acid was heated to 70° C. with stirring. To this mixture 60.6 parts of 4,4'-dicyclohexylmethane diisocyanate were added, and the resulting mixture was stirred and heated at 105° C. for 2 hours. Through the reflux condenser 100 parts of acetone were added and the reaction mixture was cooled to 56° C. 6.0 parts of triethylamine were added, followed in 15 minutes by the dropwise addition of 14.7 parts of diethanolamine. When the reaction mixture was NCO-free (as determined by IR), 383.9 parts of distilled water were added with vigorous stirring. The acetone was immediately removed from the 55° C. dispersion under reduced pressure.

pH—8.0
Solids content—35%
Functionality—4
Urethane/urea content—9.5%

Two Component Formulation

To 150 parts of Dispersion G were added 46.5 parts of Isocyanate Crosslinker A (NCO/OH ratio—3.0) and 0.12 parts of a 10% aqueous solution of Surfactant A; the mixture was stirred vigorously. Drawdown bars were used to make 6 mil WFT films on glass plates and 5 mil WFT films on steel panels treated with Bonderite chemical compositions available from Parker.

EXAMPLE 8 (Comparison)

Dispersion H 180.0 parts of a polyester of adipic acid and butanediol (OH number 50) were dehydrated under vacuum at 110° C. for 30 minutes with stirring, then cooled to 70° C. After the addition of 8.0 parts of IPDI and 12.1 parts of HDI, stirring was continued at 80° C. until a constant isocyanate content of 1.1% was reached. 400.0 parts of acetone were slowly added while maintaining the temperature at 50° C. A solution of 6.5 parts of the sodium salt of N-(2-aminoethyl)-2-aminoethanesulfonic acid (45% in water) and 1.1 parts of diethanolamine in 25 parts of distilled water were stirred into the homogeneous acetone solution at 50° C. After 7 minutes, the reaction mixture was dispersed in 286.4 parts distilled water and the acetone was immediately distilled off.

pH—7.5
Solids content—40%
Urethane/urea content—4.5%

Two Component Formulation

To 75.0 parts of Dispersion H were added 1.4 parts of Isocyanate Crosslinker B and 0.08 part of a 10% aqueous solution of Surfactant A (NCO/OH equivalent ratio—4.0); the mixture was stirred vigorously. Drawdown bars were used to make 6 mil WFT films on glass and 5 mil WFT films on Bonderite treated steel panels.

EXAMPLE 9 (Comparison)

Dispersion I

To a stirred mixture at 70° C. of 116.4 parts of Formrez YA-86-1 (available from Witco), 6.1 parts of an anhydrous polyether of propylene oxide and bisphenol A having an OH number of 202 (molecular weight 550), 8.2 parts of the monohydric polyether used to prepare Isocyanate Crosslinker A, 19.4 parts of the sodium sulfonate salt (MW 430) of propoxylated 1,4-butanediol (70% solution in toluene) were added 13.8 parts of HDI and 27.2 parts of IPDI. The reaction exothermed to 105° C. and was maintained at that temperature until the theoretical isocyanate content of 4.5% was attained. This mixture was then cooled to 60° C. and dispersed into 250.7 parts of distilled water with vigorous agitation. Immediately, a solution of 2.5 parts of ethylenediamine, 8.2 parts of an amine-terminated polyether (Jeffamine D-400, available from Texaco), and 5.1 parts of diethanolamine in 46.3 parts of distilled water was added dropwise. The dispersion was stirred at 60° C. for 3 hours and then filtered and cooled.

pH—6.8
viscosity—100 mPa.S
solids—40%
urethane/urea content—8.75%

Two Component Formulation

To 150 parts of Dispersion I were added 31.5 parts of Isocyanate Crosslinker B (NCO/OH equivalent ratio—6.0), and 0.12 parts of a 10% aqueous solution of Surfactant A; the mixture was stirred vigorously. Drawdown bars were used to make 6 rail WFT films on glass and 5 mil WFT films on Bonderite treated steel panels.

All films were cured for 2-3 weeks at ambient temperature and humidity before testing.

Two Component Film Evaluation

| Example | MEK 2x Rubs | Pendulum Hardness | Impact Dir/Ind | Tensile (psi) | Elongation (%) |
|---|---|---|---|---|---|
| 1 | 200+ | 127 | 160/160 | 4483 | 25 |
| 2 | 200+ | 116 | 160/160 | 6310 | 20 |
| 3 | 200+ | 148 | 100/60 | 8066 | 10 |
| 4 | 200+ | 132 | 160/160 | 5762 | 15 |
| 5 | 200+ | 179 | 160/160 | 9122 | 20 |
| 6 | 200+ | 116 | 160/160 | 6327 | 25 |
| 7 | 200+ | 122 | 160/160 | 4745 | 20 |
| 8 (Comp) | 30 | 62 | 160/160 | 2476 | 90 |
| 9 (Comp) | 30 | 55 | 160/160 | 2472 | 80 |

Test Methods

Tensile properties were determined according to ASTM D 638 using a Type 4 die on an Instron model 1130. Films prepared on glass were removed prior to testing.

The Erichsen pendulum hardness was determined on the films cast onto the Bonderite treated steel panels. The tester was leveled, and the steel panel was placed on the sample stage. The fulcrum points of the pendulum were lowered onto the cured film and the pendulum was deflected 6° and released. The time for the pendulum to damp to a 3° deflection was recorded.

The MEK double rubs were measured by wetting a cloth with methylethyl ketone and rubbing the cloth across the coating until the coating was removed; each back and forth motion constituting one rub.

The Gardner Impact was determined according to ASTM D 3029-84, method G.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component, aqueous coating composition which may be cured at ambient temperature to form a polyurethane coating having a surface appearance which is comparable to the surface appearance of a polyurethane coating obtained from a two-component solvent based coating composition and which comprises in unmixed form:

I) a first component based on an aqueously dispersed polyurethane wherein said polyurethane has
  a) an average hydroxy functionality of 1.8 to 8,
  b) a total content of urethane and urea groups, calculated as —NH—C—O—, of 9 to 20% by weight, based on the weight of said polyurethane,
  c) 0 to 200 milliequivalents of chemically incorporated anionic groups per 100 g of polyurethane and
  d) 0 to 25% by weight, based on the weight of said polyurethane, of ethylene oxide units incorporated within terminal and/or lateral polyether chains, wherein components c) and d) are present in an amount which is sufficient to maintain the polyurethane stably dispersed in water, and II) a second component based on a water dispersible polyisocyanate wherein said polyisocyanate has
  a) an isocyanate content of 2 to 30% by weight, based on the weight of the polyisocyanate,
  b) an average functionality of 2 to 8,
  c) 0 to 200 milliequivalents of chemically incorporated anionic groups per 100 g of polyisocyanate and
  d) 0 to 25% by weight, based on the weight of said polyisocyanate, of ethylene oxide units incorporated within terminal and/or lateral polyether chains, wherein components c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

2. The coating composition of claim 1 wherein said aqueously dispersed polyurethane has a hydroxy equivalent weight of 100 to 5000.

3. The coating composition of claim 1 wherein said aqueously dispersed polyurethane has a hydroxy equivalent weight of 1000 to 3000, an average functionality of 2 to 6 and 10 to 180 milliequivalents of chemically incorporated anionic groups per 100 g of polyurethane.

4. The coating composition of claim 1 wherein said aqueously dispersed polyisocyanate is based on the reaction product of a polyisocyanate adduct, and has an NCO functionality of 2.5 to 6, an NCO content of 10 to 25% by weight, based on the weight of said polyisocyanate and contains 2 to 15% by weight, based on the weight of said polyisocyanate, of ethylene oxide units incorporated within terminal and/or lateral polyether chains.

5. The coating composition of claim 4 wherein said polyisocyanate adduct has aliphatically and/or cycloaliphatically bound isocyanate groups.

6. The coating composition of claim 4 wherein said polyisocyanate contains isocyanurate groups and is prepared from 1,6-hexamethylene diisocyanate.

7. A two-component, aqueous coating composition which may be cured at ambient temperature to form a polyurethane coating having a surface appearance which is comparable to the surface appearance of a polyurethane coating obtained from a two-component solvent based coating composition and which comprises in unmixed form:

I) a first component based on an aqueously dispersed polyurethane wherein said polyurethane has
  a) an average hydroxy functionality of 2 to 8, b) a total content of urethane and urea groups, calculated as —NH—C—O—, of 9 to 20% by weight, based on the weight of said polyurethane, c) 10 to 180 milliequivalents of chemically incorporated anionic groups per 100 g of polyurethane, d) 0 to 25% by weight, based on the weight of said polyurethane, of ethylene oxide units incorporated within terminal and/or lateral polyether chains and e) a hydroxy equivalent weight of 500 to 4000, wherein components c) and d) are present in an amount which is sufficient to maintain the polyurethane stably dispersed in water, and II) a second component based on a water dispersible polyisocyanate wherein said polyisocyanate is based on the reaction product of a polyisocyanate adduct and has a) an isocyanate content of 10 to 25% by weight, based on the weight of the polyisocyanate, b) an average functionality of 2.5 to 6, c) 0 to 200 milliequivalents of chemically incorporated anionic groups per 100 g of polyisocyanate and d) 2 to 15% by weight, based on the weight of said polyisocyanate, of ethylene oxide units incorporated within terminal and/or lateral polyether chains, wherein components c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

8. The coating composition of claim 7 wherein said polyisocyanate adduct has aliphatically and/or cycloaliphatically bound isocyanate groups.

9. The coating composition of claim 7 wherein said polyisocyanate contains isocyanurate groups and is prepared from 1,6-hexamethylene diisocyanate.

10. A coating which is prepared from a two-component, aqueous coating composition which may be cured at ambient temperature to form a polyurethane coating having a surface appearance which is comparable to the surface appearance of a polyurethane coating obtained from a two-component solvent based coating composition and which comprises in unmixed form:

I) a first component based on an aqueously dispersed polyurethane wherein said polyurethane has a) an average hydroxy functionality of 2 to 8, b) a total content of urethane and urea groups, calculated as —NH—C—O—, of 9 to 20% by weight, based on the weight of said polyurethane, c) 0 to 200 milliequivalents of chemically incorporated anionic groups per 100 g of polyurethane and d) 0 to 25% by weight, based on the weight of said polyurethane, of ethylene oxide units incorporated within terminal and/or lateral polyether chains, wherein components c) and d) are present in an amount which is sufficient to maintain the polyurethane stably dispersed in water, and II) a second component based on a water dispersible polyisocyanate wherein said polyisocyanate has a) an isocyanate content of 2 to 30% by weight, based on the weight of the polyisocyanate, b) an average functionality of at least 1.8, c) 0 to 200 milliequivalents of chemically incorporated anionic groups per 100 g of polyisocyanate and d) 0 to 25% by weight, based on the weight of said polyisocyanate, of ethylene oxide units incorporated within terminal and/or lateral polyether chains, wherein components c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

11. The coating of claim 10 wherein said aqueously dispersed polyurethane has a hydroxy equivalent weight of 100 to 5000.

12. The coating of claim 10 wherein said aqueously dispersed polyurethane has a hydroxy equivalent weight of 1000 to 3000, an average functionality of 2 to 6 and 10 to 180 milliequivalents of chemically incorporated anionic groups per 100 g of polyurethane.

13. The coating of claim 10 wherein said aqueously dispersed polyisocyanate is based on the reaction product of a polyisocyanate adduct, and has an NCO functionality of 2.5 to 6, an NCO content of 10 to 25% by weight, based on the weight of said polyisocyanate and contains 2 to 15% by weight, based on the weight of said polyisocyanate, of ethylene oxide units incorporated within terminal and/or lateral polyether chains.

14. The coating of claim 13 wherein said polyisocyanate adduct has aliphatically and/or cycloaliphatically bound isocyanate groups.

15. The coating of claim 13 wherein said polyisocyanate contains isocyanurate groups and is prepared from 1,6-hexamethylene diisocyanate.

16. A coating which is prepared from a two-component, aqueous coating composition which may be cured at ambient temperature to form a polyurethane coating having a surface appearance which is comparable to the surface appearance of a polyurethane coating obtained from a two-component solvent based coating composition and which comprises in unmixed form:

I) a first component based on an aqueously dispersed polyurethane wherein said polyurethane has a) an average hydroxy functionality of 2 to 8, b) a total content of urethane and urea groups, calculated as —NH—C—O—, of 9 to 20% by weight, based on the weight of said polyurethane, c) 10 to 180 milliequivalents of chemically incorporated anionic groups per 100 g of polyurethane, d) 0 to 25% by weight, based on the weight of said polyurethane, of ethylene oxide units incorporated within terminal and/or lateral polyether chains and e) a hydroxy equivalent weight of 500 to 4000, wherein components c) and d) are present in an amount which is sufficient to maintain the polyurethane stably dispersed in water, and II) a second component based on a water dispersible polyisocyanate wherein said polyisocyanate is based on the reaction product of a polyisocyanate adduct and has a) an isocyanate content of 10 to 25% by weight, based on the weight of the polyisocyanate, b) an average functionality of 2.5 to 6, c) 0 to 200 milliequivalents of chemically incorporated anionic groups per 100 g of polyisocyanate and d) 2 to 15% by weight, based on the weight of said polyisocyanate, of ethylene oxide units incorporated within terminal and/or lateral polyether chains, wherein components c) and d) are present in an amount which is sufficient to maintain said polyisocyanate stably dispersed in water, and components I and II are present in an amount sufficient to provide an equivalent ratio of isocyanate groups to hydroxyl groups of 0.8:1 to 6:1.

17. The coating of claim 16 wherein said polyisocyanate adduct has aliphatically and/or cycloaliphatically bound isocyanate groups.

18. The coating of claim 16 wherein said polyisocyanate contains isocyanurate groups and is prepared from 1,6-hexamethylene diisocyanate.

* * * * *